United States Patent
Tkabladze et al.

(10) Patent No.: US 10,162,079 B2
(45) Date of Patent: Dec. 25, 2018

(54) NEUTRON-GAMMA DENSITY THROUGH NORMALIZED INELASTIC RATIO

(71) Applicant: Schlumberger Technology Corporation, Sugar Land, TX (US)

(72) Inventors: Avtandil Tkabladze, Sugar Land, TX (US); Michael Lynn Evans, Missouri City, TX (US); Kenneth Edward Stephenson, New Castle, VA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 2 days.

(21) Appl. No.: 15/422,782

(22) Filed: Feb. 2, 2017

(65) Prior Publication Data

US 2017/0146684 A1  May 25, 2017

Related U.S. Application Data

(63) Continuation of application No. 13/884,863, filed as application No. PCT/US2011/059858 on Nov. 9, 2011, now Pat. No. 9,671,519.

(Continued)

(51) Int. Cl.
    *G01V 5/10* (2006.01)
(52) U.S. Cl.
    CPC .............. *G01V 5/108* (2013.01); *G01V 5/104* (2013.01); *G01V 5/105* (2013.01); *G01V 5/107* (2013.01)
(58) Field of Classification Search
    None
    See application file for complete search history.

(56) References Cited

U.S. PATENT DOCUMENTS

| 4,286,150 A | 8/1981 | Allen |
| 4,879,463 A | 11/1989 | Wraight et al. |

(Continued)

FOREIGN PATENT DOCUMENTS

| EP | 0318343 B1 | 5/1989 |
| EP | 0388265 B1 | 9/1990 |
| WO | 91/11009 | 7/1991 |

OTHER PUBLICATIONS

Extended Search Report issued in the related EP Application 11839181.2, dated Dec. 22, 2014 (7 pages).

(Continued)

*Primary Examiner* — Edwin Gunberg
(74) *Attorney, Agent, or Firm* — Michael Dae

(57) ABSTRACT

Systems, methods, and devices for determining a neutron-gamma density (NGD) measurement of a subterranean formation that is accurate in both liquid- and gas-filled formations are provided. For example, a downhole tool for obtaining such an NGD measurement may include a neutron generator, a neutron detector, two gamma-ray detectors, and data processing circuitry. The neutron generator may emit neutrons into a formation, causing a fast neutron cloud to form. The neutron detector may detect a count of neutrons representing the extent of the neutron cloud. The gamma-ray detectors may detect counts of inelastic gamma-rays caused by neutrons that inelastically scatter off the formation. Since the extent of the fast neutron cloud may vary depending on whether the formation is liquid- or gas-filled, the data processing circuitry may determine the density of the formation based at least in part on the counts of inelastic gamma-rays normalized to the count of neutrons.

20 Claims, 4 Drawing Sheets

Related U.S. Application Data

(60) Provisional application No. 61/412,643, filed on Nov. 11, 2010.

(56) References Cited

U.S. PATENT DOCUMENTS

| | | | |
|---|---|---|---|
| 5,804,820 | A | 9/1998 | Evans et al. |
| 6,207,953 | B1 | 3/2001 | Wilson |
| 6,754,586 | B1 | 6/2004 | Adolph et al. |
| 7,117,092 | B2 * | 10/2006 | Jacobson ............... G01V 5/101 702/8 |
| 2002/0036260 | A1 | 3/2002 | Adolph |
| 2003/0178560 | A1 | 9/2003 | Odom et al. |
| 2007/0241275 | A1 | 10/2007 | Guo et al. |
| 2011/0012015 | A1 * | 1/2011 | Evans ..................... G01V 5/14 250/269.2 |

OTHER PUBLICATIONS

Communication pursuant to Article 94(3) EPC issued in the elated EP Application 11839181.2, dated Jan. 20, 2016 (5 pages).
Examination report issued in the related GC application P/2012/20793, dated Feb. 14, 2016 (5 pages).
International Search Report for PCT Application Serial No. PCT/US2011/059858 dated Jun. 27, 2012 (10 pages).
International Preliminary Report on Patentability issued in the related PCT application PCT/US2011/059858 dated May 14, 2013 (6 pages).

* cited by examiner

NEUTRON-GAMMA DENSITY THROUGH NORMALIZED INELASTIC RATIO

CROSS-REFERENCE TO RELATED APPLICATIONS

This application is a continuation application of Ser. No. 13/884,863, which is a U.S. National Stage entry of PCT/US11/59858, filed on Nov. 9, 2011, which claims priority from U.S. provisional application 61/412,643, filed on Nov. 11, 2010, the entire disclosure of which is hereby incorporated herein by reference.

BACKGROUND

The present disclosure relates generally to well logging techniques and, more particularly, to a neutron-gamma density measurement that accounts for both liquid-filled and gas-filled formations.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

To determine the composition and porosity of a subterranean formation, several simultaneous measurements are obtained, namely hydrogen index and formation density. Hydrogen index, which corresponds to the hydrogen content of the formation, can be determined based on neutron transport through the formation, since neutron flux through a formation attenuated with distance from a neutron source depends strongly on the hydrogen content of the formation. When neutrons are emitted into the formation from a neutron source in a downhole tool, and subsequently detected by a neutron detector of the downhole tool after scattering in the formation, the hydrogen index of the formation may be determined.

Hydrogen index generally relates to the porosity of the formation because pore spaces of the formation may be filled with some amount of hydrogen. For liquid-filled pores, the hydrogen index may correspond to the porosity of the formation in a properly calibrated tool. On the other hand, when the pore spaces of the formation are filled with gas rather than liquid, the hydrogen index measurement can be misleading. Indeed, the pores of a gas-filled formation may hold less hydrogen than the pores of a liquid-filled formation of the same porosity. In other words, gas-filled and liquid-filled formations of the same porosity have different densities. Thus, the formation density measurement may be used to determine the degree to which a formation is gas-filled or liquid-filled, revealing the proper porosity of the formation.

While the hydrogen index measurement may involve neutron transport, the formation density measurement involves the scattering of gamma-rays through the formation. Conventionally, obtaining a gamma density involves irradiating the formation with gamma-rays using a radioisotopic source (e.g., $^{137}$Cs or $^{241}$AmBe). These gamma-rays may Compton scatter from the electrons present in the formation before being detected by a gamma-ray detector spaced some distance from the gamma-ray source. Since the electron concentration is proportional to the atomic number of the elements, and the degree to which the gamma-rays Compton scatter and return to the gamma-ray detector relates to the electron concentration, the density of the formation may be detected using this technique.

The use of radioisotopic sources such as $^{137}$Cs or $^{241}$AmBe may be undesirable in a downhole tool. Among other things, such radioisotopic sources may present an environmental concern and may involve special handling requirements. Additionally, any gamma-ray source that is used in a cased-hole density measurement may emit gamma-rays that are attenuated strongly by the casing material, resulting in much fewer gamma-rays reaching the formation than otherwise. This gamma-ray attenuation may cause a cased-hole gamma-gamma density measurement impossible or inaccurate.

Some techniques have been developed to generate gamma-rays for a formation density measurement without using any radioisotopic gamma-ray sources. Instead, gamma-rays for a formation density measurement may be created when neutrons, emitted by an electronic neutron generator, inelastically scatter off certain elements in the formation. Such a formation density measurement may be referred to as a neutron-gamma density (NGD) measurement, as distinguished from the conventional gamma-gamma density (GGD) measurements that rely on radioisotopic gamma-ray sources. In an NGD measurement, fast neutrons may pass through borehole casing material to reach the formation, where these neutrons may inelastically scatter on oxygen and certain other atoms in the formation. This inelastic scattering produces high-energy gamma-rays that can be detected by the gamma-ray detectors in the tool. Existing NGD techniques provide accurate results in the case of liquid-filled formations. However, in the presence of gas in the formation, the density reading according to existing NGD techniques tends to deviate from the real formation density.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Present embodiments relate to systems, methods, and devices for determining a neutron-gamma density (NGD) measurement of a subterranean formation that is accurate in both liquid- and gas-filled formations. For example, a downhole tool for obtaining such an NGD measurement may include a neutron generator, a neutron detector, two gamma-ray detectors, and data processing circuitry. The neutron generator may emit neutrons into a formation, causing a fast neutron cloud to form. The neutron detector may detect a count of neutrons representing the extent of the neutron cloud. The gamma-ray detectors may detect counts of inelastic gamma-rays caused by neutrons that inelastically scatter off the formation. Since the extent of the fast neutron cloud may vary depending on whether the formation is liquid- or gas-filled, the data processing circuitry may determine the density of the formation based at least in part on the counts of inelastic gamma-rays normalized to the count of neutrons.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Embodiments of the present disclosure relate to techniques for obtaining a neutron-gamma density (NGD) measurement of a subterranean formation that remains accurate regardless of whether the pores of the formation are liquid- or gas-filled. A downhole tool for obtaining such an NGD measurement may include a neutron source, at least one neutron detector, and two gamma-ray detectors. When the downhole tool is lowered into a borehole of a subterranean formation, the neutron source may emit neutrons of at least 2 MeV into the formation for a brief period of time, referred to herein as an "burst gate," during which the neutrons may inelastically scatter off certain elements in the formation, (e.g., oxygen) to produce gamma-rays. The gamma-ray detectors may detect these inelastic gamma-rays. Since the quantity of inelastic gamma-rays that occur may depend upon the extent of the fast neutron cloud emitted by the neutron source, which itself may vary depending on the liquid- or gas-filled nature of the formation, the neutron detector of the downhole tool may measure the extent of the neutron cloud by obtaining a neutron count occurring during the burst gate. Thereafter, the inelastic gamma-rays detected by the gamma-ray detectors may be normalized to this count of neutrons. A resulting neutron-gamma density measurement based on such a normalized value may remain accurate regardless of whether the formation is liquid- or gas-filled.

Figure 1:
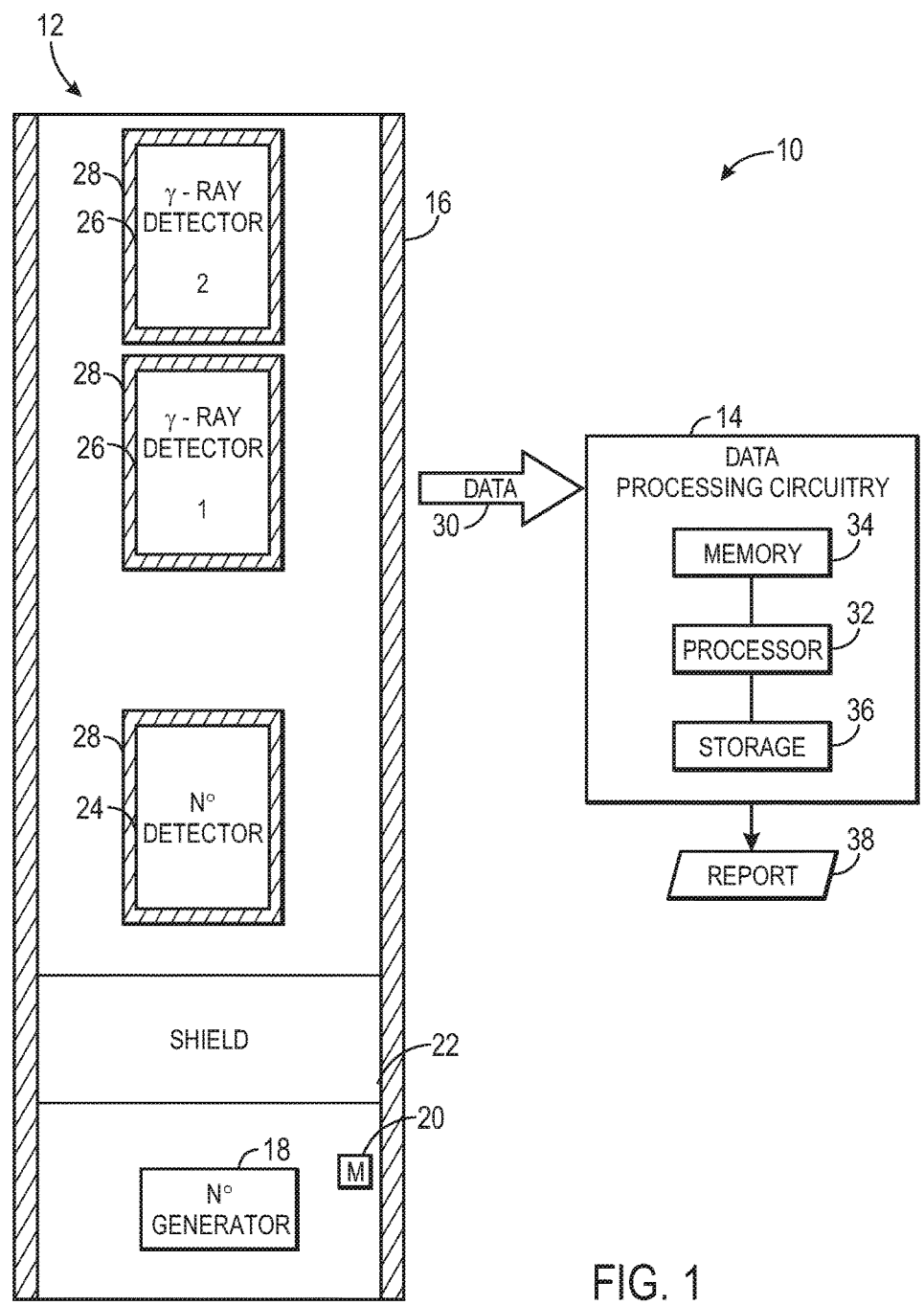
FIG. 1 is a block diagram of a well-logging system for performing a neutron-gamma density (NGD) measurement accurate for both liquid- and gas-filled formations, in accordance with an embodiment.

With the foregoing in mind, FIG. 1 represents a neutron-gamma density (NGD) measurement system 10, which may include a downhole tool 12 and associated data processing circuitry 14. Although the downhole tool 12 and the data processing circuitry 14 are depicted as independent elements in FIG. 1, it should be appreciated that the data processing circuitry 14 may be implemented entirely within the downhole tool 12, at the surface remote from the downhole tool 12, or partly within the downhole tool 12 and partly at the surface.

The downhole tool 12 may include a housing 16, within which a variety of components may reside. A neutron generator 18 may serve as a neutron source that emits neutrons of at least 2 MeV, which is believed to be approximately the minimum energy to create gamma-rays through inelastic scattering with formation elements. By way of example, the neutron source 18 may be an electronic neutron source, such as a Minitron™ by Schlumberger Technology Corporation, which may produce pulses of neutrons through d-D and/or d-T reactions. The neutron source 18 may emit neutrons of 14.1 MeV. In some embodiments, a neutron monitor 20 may monitor neutron emissions from the neutron source 18 to more precisely observe the quantity of neutrons emitted by the neutron source 18. The neutron monitor 20 may be a plastic scintillator and photomultiplier that may primarily detect unscattered neutrons directly from the neutron source 18, and may provide a count rate signal proportional to the neutron output rate from the neutron source 18.

Neutron shielding 22, which may include lead, for example, may largely prevent neutrons from the neutron generator 18 from passing internally through the downhole tool 12 toward a neutron detector 24 or gamma-ray detectors 26. In addition, as shown in FIG. 1, the neutron detector 24 and the gamma-ray detectors 26 may include thermal neutron shielding 28. As will be discussed below, this thermal neutron shielding 28 may prevent thermal neutrons from contaminating the measurements they obtain. Additionally or alternatively, the neutron detector 24 may not include such thermal neutron shielding.

The neutron detector 24 may be a $^3$He neutron detector that, when surrounded by the thermal neutron shielding 28, primarily detects epithermal or fast neutrons. As will be discussed below, the detection of substantially only epithermal and/or fast neutrons may allow the neutron detector 24 to measure the extent of a fast neutron cloud that may vary in size depending on the liquid- or gas-filled nature of a surrounding subterranean formation. In some embodiments, the count of neutrons detected by the neutron detector 24 may be normalized to a count of neutrons detected by the neutron monitor 20. Indeed, in the techniques described herein, neutron counts from the neutron detector 24 are understood to be normalized to the output of the neutron generator 18 as detected by the neutron monitor 20. Alternatively, another neutron detector 24 (not shown) may be present and a ratio of neutron counts from the two neutron detectors 24 may be used in the neutron-gamma density (NGD) measurement described herein. In other embodiments, the neutron detector 24 may not necessarily be surrounded by the shielding 28. Without shielding, however, the neutron detector 24 counts will be dominated by thermal neutrons that are sensitive to the hydrogen index of the formation and less dependent on the extent of the fast neutron cloud.

In general, the downhole tool 12 may include two gamma-ray detectors 26 surrounded by neutron shielding 28. These gamma-ray detectors 26 may be spaced two respective distances from the neutron generator 18. In other embodiments, additional gamma-ray detectors 26 may be employed by the downhole tool 12. The neutron shielding 28 may include, for example, $^6$Li, such as lithium carbonate ($Li_2CO_3$), which may substantially shield the gamma-ray detectors 26 from thermal neutrons without producing thermal neutron capture gamma-rays. The gamma-ray detectors 26 may detect inelastic gamma-rays that are generated when fast neutrons inelastically scatter off certain elements of a surrounding subterranean formation. As will be discussed below, a ratio of inelastic gamma-ray counts obtained from the gamma-ray detectors 26, normalized to a neutron count from the neutron detector 24, may be used to obtain a neutron-gamma density (NGD) measurement that remains accurate regardless of whether the surrounding formation is liquid- or gas-filled.

The counts of gamma-rays from the gamma-ray detectors 26 and the count of neutrons from the neutron detector 24 may be received by the data processing circuitry 14 as data 30. The data processing circuitry 14 may receive the data 30 and perform certain processing to determine one or more property of the materials surrounding the downhole tool 12, such as formation density. The data processing circuitry 14 may include a processor 32, memory 34, and/or storage 36. The processor 32 may be operably coupled to the memory 34 and/or the storage 36 to carry out the presently disclosed techniques. These techniques may be carried out by the processor 32 and/or other data processing circuitry based on certain instructions executable by the processor 32. Such instructions may be stored using any suitable article of manufacture, which may include one or more tangible, computer-readable media to at least collectively store these instructions. The article of manufacture may include, for example, the memory 34 and/or the nonvolatile storage 36. The memory 34 and the nonvolatile storage 36 may include any suitable articles of manufacture for storing data and executable instructions, such as random-access memory, read-only memory, rewriteable flash memory, hard drives, and optical disks.

The downhole tool 12 may transmit the data 30 to the data processing circuitry 14 via, for example, internal connections within the tool, a telemetry system communication downlink, and/or a communication cable. The data processing circuitry 14 may determine one or more properties of the surrounding formation. By way of example, such a property may include the formation density. Thereafter, the data processing circuitry 14 may output a report 38 indicating the one or more ascertained properties of the formation. The report 38 may be stored in memory or may be provided to an operator via one or more output devices, such as an electronic display.

Figure 2:
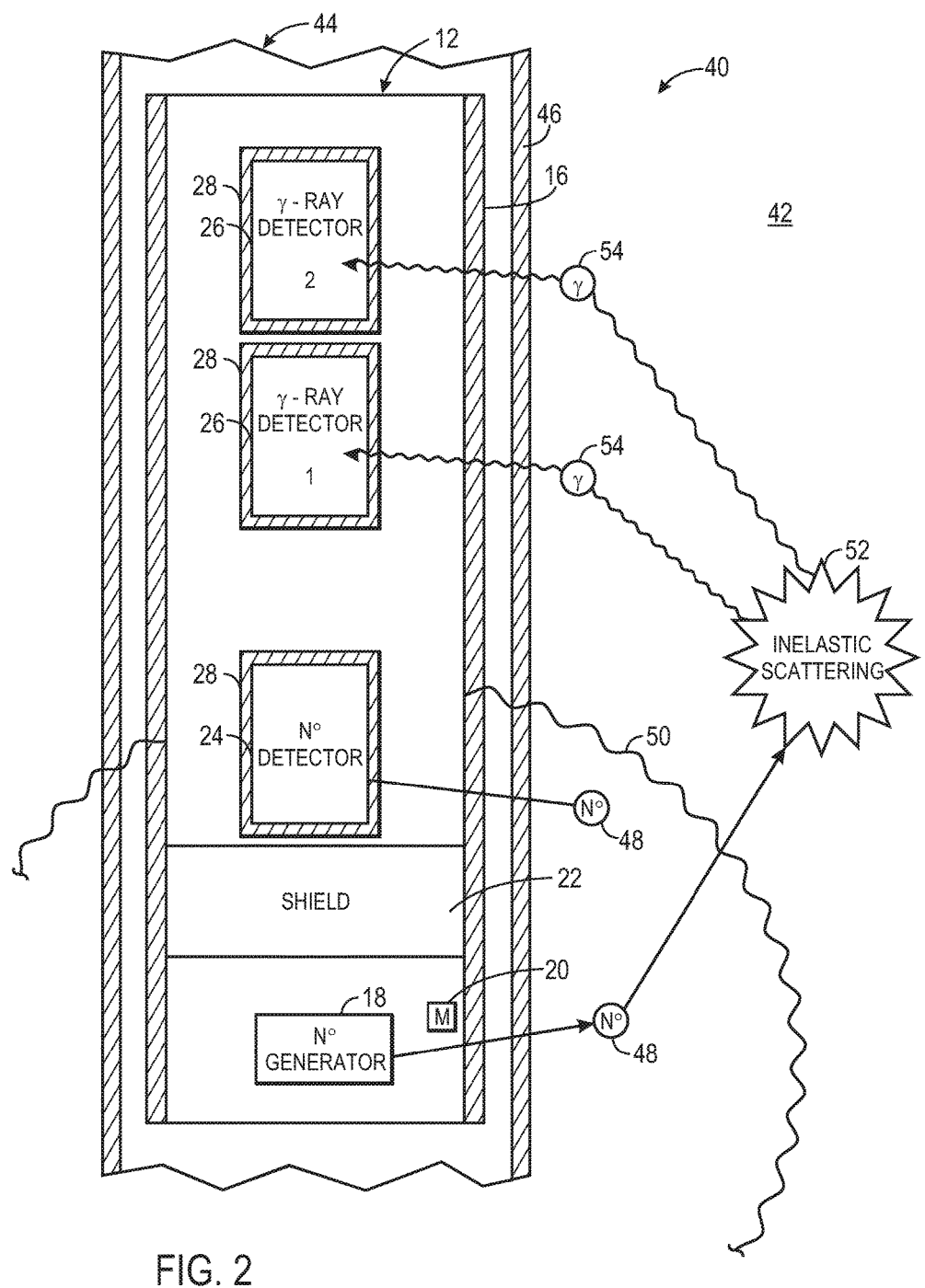
FIG. 2 is a block diagram of a well-logging operation involving the downhole tool of FIG. 1, in accordance with an embodiment.

The downhole tool 12 may be used to obtain a neutron-gamma density (NGD) measurement independent of the liquid- or gas-filled nature of a subterranean formation, as shown in a neutron-gamma density well-logging operation 40 of FIG. 2. As shown in FIG. 2, the neutron-gamma density well-logging operation 40 may involve lowering the downhole tool 12 into a subterranean formation 42 through a borehole 44. In the example of FIG. 2, the borehole 44 is cased with a casing 46. Although such casing 46 could attenuate a gamma-gamma density tool that utilized a gamma-ray source instead of a neutron generator 18, the casing 46 will not prevent the determination of an NGD measurement because the neutrons pass through the casing without significant attenuation.

Specifically, the neutron generator 18 may emit burst of neutrons 48 for a relatively short period of time (e.g., 10 μs or 20 μs, or such) sufficient to substantially only allow for inelastic scattering to take place (i.e., an burst gate). The burst of neutrons 48 during the burst gate may form a fast neutron cloud 50, the extent of which may vary depending upon the liquid- or gas-filled nature of the subterranean formation 42. The neutron detector 24 may measure the scope of the neutron cloud 50 by detecting epithermal neutrons 48, which pass into from the formation 42, through the thermal neutron shielding 28, and into the neutron detector 24. In other embodiments, the extent of the neutron cloud 50 may be estimated by measuring thermal, fast, and epithermal neutrons using a neutron detector 24 that does not have the thermal neutron shielding 28.

Many of the fast neutrons 48 emitted by the neutron generator 18 may inelastically scatter 52 against some of the elements of the formation 42. This inelastic scattering produces inelastic gamma-rays 54, which may be detected by the gamma-ray detectors 26. As will be discussed below, by determining a formation density by taking a ratio of inelastic gamma-rays 54 detected using two gamma-ray detectors 26 at different spacings from the neutron generator 18, lithology effects may be largely eliminated. Moreover, by normalizing the ratio of inelastic gamma-rays to the neutron count obtained by the neutron detector 24, a neutron-gamma density (NGD) measurement may be obtained that may remain accurate whether the formation 42 is liquid- or gas-filled.

Figure 3:
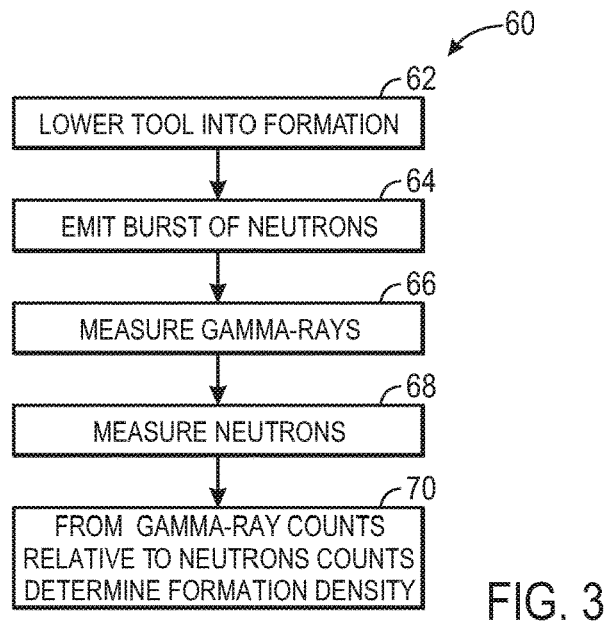
FIG. 3 is a flowchart describing an embodiment of a method for performing the well-logging operation of FIG. 2.

The neutron-gamma density well-logging operation 40 may take place in a variety of manners. Flowchart 60 of FIG. 3 represents one embodiment of a method for performing the neutron-gamma density well-logging operation 40. The flowchart 60 may begin when the downhole tool 12 is lowered into the formation 42 (block 62). The downhole tool 12 may be lowered into a borehole 44 in the formation 42 using any suitable means of conveyance, such as wire line, coiled tubing, logging-while-drilling (LWD), and so forth.

The neutron generator 18 may periodically emit a burst of neutrons of high enough energy to produce gamma-rays through inelastic scattering 52 during a relatively short period of time referred to as the "burst gate," which may be approximately 10 μs to 20 μs, for example (block 64). The resulting inelastic scattering 52 may produce inelastic gamma-rays 54. These inelastic gamma-rays 54 may be measured from the two gamma-ray detectors 26 during the burst gate (block 66). Simultaneously, the neutron detector 24 may detect a count of the neutrons, particularly epithermal neutrons 48, that relate to the extent of the neutron cloud 50 during the burst gate (block 68). Subsequently, using the gamma-ray counts measured by the gamma-ray detectors 26 relative to the neutron 48 count obtained by the neutron detector 24, the data processing circuitry 14 may determine a neutron-gamma density measurement that remains accurate despite the liquid- or gas-filled nature of the formation 42 (block 70).

The density measurement of block 70 may be determined by combining the count rates of the inelastic gamma-rays 54 from the gamma-ray detectors 26 and the neutron 48 count from the neutron detector 24. Specifically, as briefly mentioned above, the number of gamma-rays detected by the gamma-ray detectors 26 is defined by two different physics processes, namely, (1) neutron transport and inelastic scattering on elements of the formation 42 and the (2) photon transport in the formation 42. The energetic neutrons 48 from the neutron generator 18 reach the formation 42 and act as secondary sources for the gamma-rays 54. In general, the flux of gamma-rays reaching the gamma-ray detectors 26 can be written as follows:

$$N_r \Box n_o \int N(\vec{r}) \exp(-cd, \rho) d\vec{r} \quad (1).$$

In the equation above, $n_o$ is a concentration of oxygen or other elements producing gamma-rays 54 in neutron inelastic scattering 52. The term $N(\vec{r})$ is a distribution of fast neutrons. The term $d\vec{r}$ is a distance from the scattering point 52 to the gamma-ray detectors 26. The integration of equation 1 has to be performed in whole 3-dimensional space around the neutron generator 18 and the gamma-ray detectors 26. Monte Carlo N-Particle transport code (MCNP) simulation shows that inelastic gamma-rays 54 are produced by fast neutrons 48 with energy generally above 2 MeV. The factor $N(\vec{r})$ is mainly defined by the density of the formation 42 and the concentration of oxygen atoms and atoms of other elements with high inelastic cross sections, such as carbon or calcium, in the formation 42. The fast neutron 48 distribution does not depend strongly on the hydrogen index of the formation 42. Indeed, the neutron scattering cross-section of hydrogen falls rapidly with increasing neutron energy, such as the energy of the neutrons 48 of the fast neutron cloud 50.

The attenuation of the gamma-rays 54, or photon transport, depends only on the density of the formation 42. It is worth mentioning that the physics of both neutron transport and photon transport is similar for liquid- and gas-filled formations 42. The major difference between liquid- and gas-filled formations 42 is the hydrogen index. As mentioned above, hydrogen index does not have a strong impact on the fast neutron transport in the formation 42. Thus, inelastic gamma-ray 54 counts by the gamma-ray detectors 26 depend on the density of the formation and concentration of atoms of oxygen and other elements with high inelastic scattering cross-section in the formation 42, and not on the hydrogen index. Moreover, the extent of the fast neutron cloud 50 does not substantially relate to the hydrogen index.

Considering a ratio of gamma-ray detector 26 inelastic gamma-ray 54 counts, the implicit dependence on the concentration of elements with a significant inelastic scattering cross-section counsels out:

$$\frac{N_r^1}{N_r^2} \Box \frac{\int N(\vec{r}) \exp\left(-cd\frac{1}{r}\rho\right) d\vec{r}}{\int N(\vec{r}) \exp\left(-cd\frac{2}{r}\rho\right) d\vec{r}}. \quad (2)$$

The fast neutron 48 flux drops rapidly. If the gamma-ray detectors 26 are positioned far enough from the neutron generator 18, one can assume that $d_r^{1,2} \cong d^{1,2}$ where $d^{1,2}$ is the distance from the neutron generator 18 from the 2 gamma-ray detectors 26. In this approximation, the density-dependent factors in the integrand do not depend on the integration variable $(\vec{r})$, and equation 2 may be read as follows:

$$\frac{N_r^1}{N_r^2} \approx \exp(-c(d^1 - d^2)\rho).$$

As such, the dependence of the inelastic gamma-rays 54 on the fast neutron flux is cancelled, and the neutron cloud 50 size is considered small compared to the distance to the two gamma-ray detectors 26. This approximation may be equivalent to having a point-like gamma-ray source. The ratio of two inelastic gamma-ray 54 counts from the two gamma-ray detectors 26 depends on the distance between the two gamma-ray detectors 26. In realistic cases, the gamma-ray detectors 26 could not be moved far enough from the neutron generator 18, and thus the ratio above depends on the extent of the fast neutron cloud 50 as well.

The effect of the variation in the fast neutron cloud 50 can be estimated by considering those events where scattering occurs close to the gamma-ray detectors 26. In that case $d_r^1 \approx d_r^2 \approx 0$ and the gamma-ray 54 flux only depends on the flux of high-energy neutron 48 near the gamma-ray detectors 26. According to slowing down theory, the flux of neutrons 48 at distance r from the source in infinite media is as follows:

$$N_r \Box \frac{S}{4\pi\Sigma_r L^2} \frac{e^{-\frac{r}{L}}}{r},$$

where S is the source length, Σ is the removal cross section from the high energy group of neutrons 48, and L is the slowing down length for the same group of neutrons 48. Taking the ratio as in equation (2) above gives the following:

$$\frac{N_r^1}{N_r^2} \approx \frac{d^2}{d^1} \exp(-(d^1 - d^2)/L).$$

Since L is inversely related to the number density of scattering nuclei (e.g., oxygen) in the formation 42, a basic density dependence may be seen. Indeed, the inelastic gamma-ray 54 count rate ratio (IRAT) has a different behavior in liquid- and gas-filled formations 42. This relationship is shown by a plot 80 of FIG. 4. In the plot 80, an ordinate 82 represents IRAT and an abscissa 84 represents density in units of g/cc. As apparent in the plot 80, the IRAT count rates tend to vary depending upon whether the formation 42 is filled with water (circles) or filled with methane gas (asterisks), rather than whether the formation 42 is sandstone (black) or limestone (gray).

Figure 4:
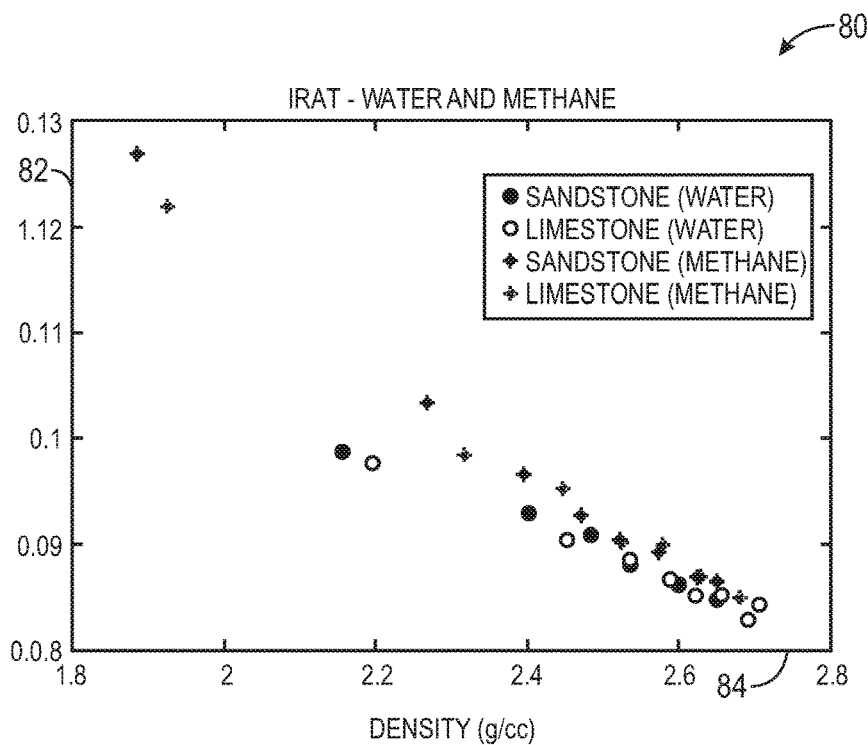
FIG. 4 is a plot modeling relationship between ratios of inelastic gamma-ray counts (IRAT) obtained by gamma-ray detectors of the downhole tool of FIG. 1 and densities of liquid- and gas-filled formations, in accordance with an embodiment.

The results illustrated in the plot 80 of FIG. 4 are obtained using MCNP Monte Carlo simulation. As mentioned above, the extent of the fast neutron cloud 50 does not depend strongly on the hydrogen index of the formation 42. On the other hand, there is another distinction between liquid- and gas-filled formations 42. With increasing formation 42 porosity, the density of liquid-filled formations 42 falls more slowly than the density of gas-filled formations 42. In addition, the concentration of oxygen atoms decreases slowly in liquid-filled formations 42 with increasing porosity compared to gas-filled formations 42. For this reason, dependence of the inelastic ratio (IRAT) on the density measurement are different depending on whether the formation 42 is filled with water (circles) or methane gas (asterisks), as represented in the plot 80 of FIG. 4.

Figure 5:
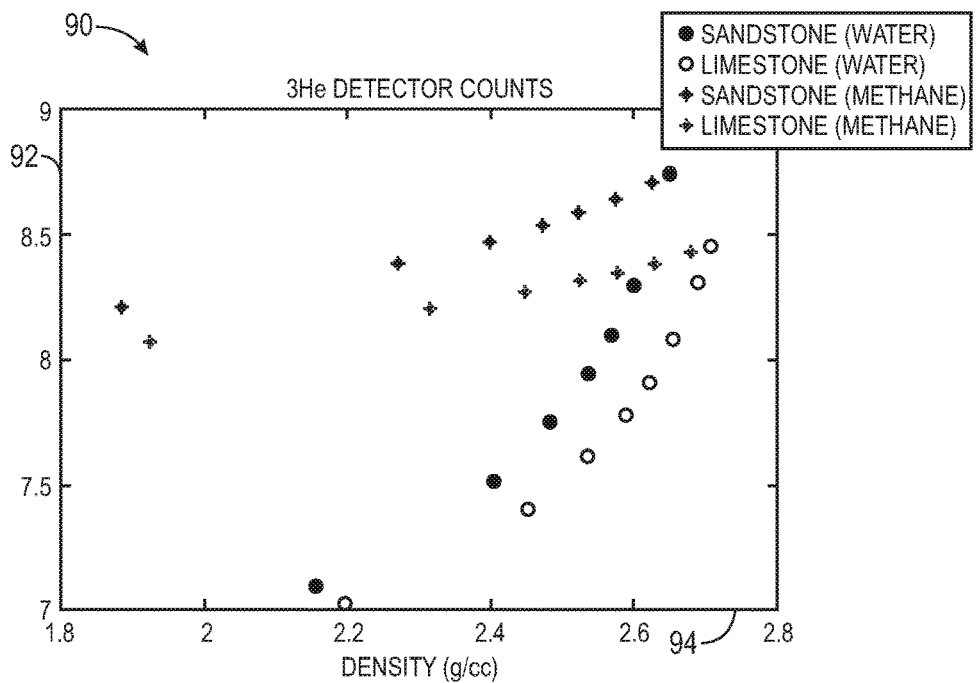
FIG. 5 is a plot modeling a relationship between neutron counts obtained by a neutron detector of the downhole tool of FIG. 1 and densities of liquid- and gas-filled formations, in accordance with an embodiment.

This difference can be compensated for using a signal that varies according to the neutron transport of the formation 42. The neutron transport 42 can be determined using epithermal neutron 48 counts, although thermal or high-energy neutron 48 counts may be used as well. A plot 90 of FIG. 5 represents that the differences between neutron counts for gas-filled and water-filled formations 42 are more significant than the differences between neutron 48 counts for different formation 42 lithologies. In the plot 90, an ordinate 92 represents neutron 48 counts using the neutron detector 24, and an abscissa 94 represents density in units of g/cc. As can be seen in the plot 90, the neutron 48 count rates vary with density in one general manner for water-filled formations 42 (circles) of both sandstone (black) and limestone (gray). Likewise, the neutron 48 count rates vary with density in another general manner for methane-gas-filled formations 42 (asterisks) of both sandstone (black) and limestone (gray).

From a relationship such as that illustrated by the plot 90 of FIG. 5, based on experimental or simulation data related to the neutron 48 counts, a suitable normalization coefficient may be selected for both to cause density of both liquid- and gas-filled formation 42 points to fall to a single line relative to the inelastic ratio (IRAT). In one embodiment, the functional form of such may be IRAT−c*log($^3$He−b), where the term IRAT represents the ratio of inelastic gamma-rays 54 detected by the gamma-ray detectors 26, and the term c*log(3He−b) represents a fit of neutron 48 counts sufficient to normalize the IRAT such that this normalized IRAT varies linearly with formation 42 density regardless of whether the formation 42 is liquid- or gas-filled. In other embodiments, other functional forms may be chosen such that the density of both liquid- and gas-filled formation 42 points to fall to a single line relative to the inelastic ratio (IRAT).

Figure 6:
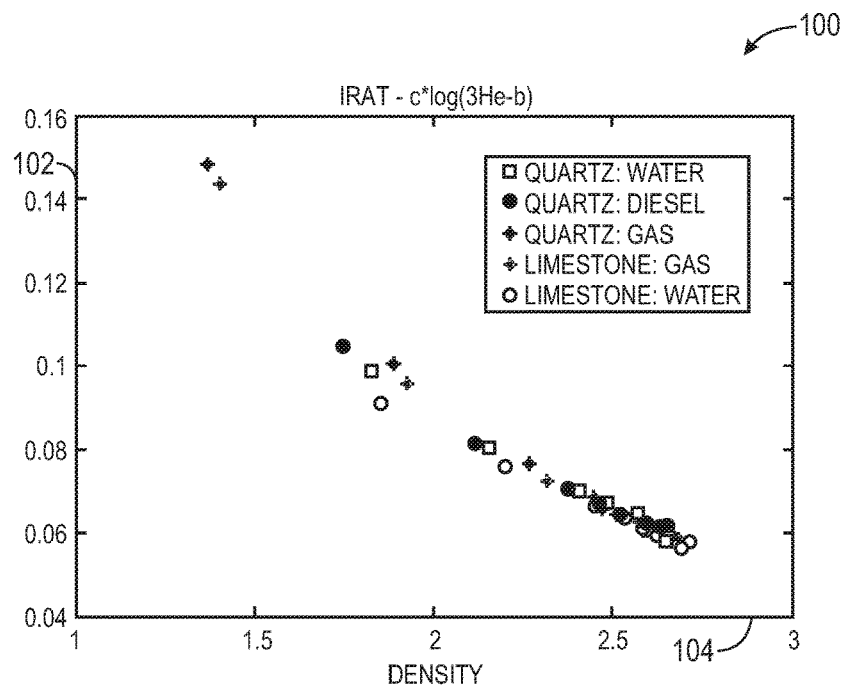
FIG. 6 is a plot modeling a relationship between ratios of inelastic gamma-ray-counts (IRAT) normalized to neutron counts and densities of liquid- and gas-filled formations, in accordance with an embodiment.

A plot 100 of FIG. 6 represents the relationship between density and such an inelastic ratio (IRAT) of inelastic gamma-rays 54 detected by the gamma-ray detectors 26 normalized to the neutrons 48 detected by the neutron detector 24. An ordinate 102 of the plot 100 represents the normalized IRAT, here IRAT−c*log($^3$He−b), and an abscissa 104 represents formation 42 density in units of g/cc. As apparent, regardless of the lithology of the formation 42, the normalized IRAT varies substantially linearly with formation 42 density independent of the liquid- or gas-filled nature of the formation 42.

Additional refinements to the above-described technique are envisaged. Specifically, a background signal caused by thermal and epithermal neutron capture, which cause additional gamma-rays to be emitted, may build up within the gamma-ray detectors 26 over time following a neutron 48 burst from the neutron generator 18. As such, background subtraction may be necessary to separate the inelastic gamma-ray 54 signal from the background resulting from such thermal and epithermal neutron capture. The background events may be counted after the burst gate of the neutron generator 18 (e.g., by measuring additional gamma-rays known not to be caused by inelastic scattering 52 using the gamma-ray detectors 26 and/or measuring additional neutrons following the burst gate using the neutron detector 24). It should further be understood that the background time gate and corresponding coefficient can be considered as free parameters and optimized based on experimental measurements.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A downhole tool comprising:
   a neutron generator configured to emit neutrons into a subterranean formation;
   a neutron detector configured to detect a count of neutrons that return to the downhole tool after interacting with the subterranean formation;
   a plurality of gamma-ray detectors configured to detect counts of inelastic gamma-rays that form when neutrons are inelastically scattered by the subterranean formation;
   a neutron monitor detector configured to determine the flux of neutrons emitted by the neutron generator; and
   data processing circuitry configured to determine a ratio of inelastic counts between at least two of the gamma ray detectors, normalize the count of neutrons by the flux of neutrons, and determine a density of the subterranean formation based at least in part on the ratio of inelastic gamma-rays and the normalized count of neutrons.

2. The downhole tool of claim 1, wherein the neutron generator is configured to emit neutrons of at least 2 MeV.

3. The downhole tool of claim 1, wherein the neutron detector is shielded from thermal neutrons so as to detect epithermal neutrons but not thermal neutrons.

4. The downhole tool of claim 1, wherein the neutron monitor is configured to detect fast neutrons.

5. The downhole tool of claim 1, wherein the neutron detector is configured to detect thermal neutrons.

6. The downhole tool of claim 1, wherein the plurality of gamma-ray detectors comprises a first gamma-ray detector spaced a first distance from the neutron generator and a second gamma-ray detector spaced a second distance from the neutron generator.

7. The downhole tool of claim 1, wherein the plurality of gamma-ray detectors are shielded from neutrons to reduce neutron capture background radiation.

8. A method comprising:
   lowering a downhole tool into a subterranean formation through a borehole;
   emitting a burst of neutrons of at least 2 MeV into the subterranean formation using a neutron generator in the downhole tool during a burst gate;
   determining, by a neutron monitor, a flux of neutrons emitted by the neutron generator;
   detecting, during the burst gate, two first counts of gamma-rays that include inelastic gamma-rays formed when the emitted neutrons inelastically scatter off the subterranean formation using two gamma-ray detectors spaced two respective distances from the neutron generator in the downhole tool;
   detecting a first count of neutrons that return to the downhole tool after interacting with the subterranean formation using a neutron detector in the downhole tool;

normalizing the first count of neutrons by the flux of neutrons determined by the neutron monitor; and determining a density measurement of the subterranean formation based at least in part on a ratio of the two first counts of gamma-rays and the normalized first count of neutrons using data processing circuitry associated with the downhole tool.

9. The method of claim 8, wherein the burst gate is a period of time sufficient to allow the inelastic gamma-rays to be created through inelastic scattering off the subterranean formation but not to allow thermal neutrons to outnumber epithermal neutrons detected by the neutron detector during the burst gate.

10. The method of claim 8, wherein the burst gate is a period of time between approximately 10 µs and 20 µs.

11. The method of claim 8, wherein the density measurement is determined using the data processing circuitry, wherein the data processing circuitry is disposed within the downhole tool or at a remote location, or partially within the downhole tool and partially at the remote location.

12. The method of claim 8, wherein the density measurement is determined based at least in part on the following relationship:

$$IRAT-c*\log(^3He-b),$$

where IRAT represents the ratio of the two first counts of gamma-rays, c and b represent normalization constants, and $^3$He represents the first count of neutrons normalized by the flux a count of the neutron monitor.

13. The method of claim 8, comprising detecting, after the burst gate, two second counts of gamma-rays that include a background of neutron capture gamma-rays and subtracting the two second counts of gamma-rays from the two first counts of gamma-rays to remove the background from the two first counts of gamma-rays, and the ratio is obtained by dividing the background subtracted net inelastic counts.

14. A downhole tool comprising:
a neutron generator configured to emit neutrons into a subterranean formation to form a fast neutron cloud, wherein an extent of the fast neutron cloud varies at least in part on an extent to which the subterranean formation is filled with liquid or gas;
a plurality of gamma-ray detectors configured to detect counts of inelastic gamma-rays caused by inelastic scattering when the neutrons of the fast neutron cloud inelastically scatter off the formation;
a neutron detector configured to measure the extent of the fast neutron cloud;
a neutron monitor configured to determine a flux of neutrons emitted by the neutron generator; and
data processing circuitry configured to determine a density of the subterranean formation regardless of whether the subterranean formation is liquid-filled or gas-filled based at least in part on a ratio of the counts of inelastic gamma-rays, optionally subtracted of background gamma rays, and the measurement of the extent of the fast neutron cloud normalized by the flux of neutrons.

15. The downhole tool of claim 14, wherein the neutron detector is configured to measure the extent of the fast neutron cloud by detecting a count of epithermal neutrons that return to the downhole tool from the burst of neutrons emitted into the subterranean formation normalized by the flux of neutrons.

16. The downhole tool of claim 14, wherein the neutron detector is configured to measure the extent of the fast neutron cloud by detecting a count of thermal, fast, and epithermal neutrons that return to the downhole tool from the burst of neutrons emitted into the subterranean formation.

17. The downhole tool of claim 14, wherein the density measurement is determined based at least in part on the following relationship:

$$IRAT-c*\log(^3He-b),$$

where IRAT represents the ratio of the two counts of inelastic gamma-rays, $^3$He represents the count of neutrons, and c and b represent constants selected to cause the ratio of inelastic gamma-rays to vary linearly with density regardless of whether the subterranean formation is liquid-filled or gas-filled.

18. The downhole tool of claim 14, wherein the gamma ray detector is shielded from thermal neutrons by surrounding it by a thermal neutron absorber.

19. The downhole tool of claim 18, wherein the neutron absorber does not emit gamma rays as a consequence of the absorption of a neutron.

20. The downhole tool of claim 19, wherein the neutron absorber contains $^6$Li.

* * * * *